Nov. 23, 1971 R. E. BOWLES 3,621,861

FLUIDIC AMPLIFIERS WITH ADAPTIVE GAIN AND/OR FREQUENCY RESPONSES

Filed Nov. 12, 1969 5 Sheets-Sheet 1

INVENTOR
RONALD E. BOWLES

BY Hurvitz + Rose

ATTORNEYS

INVENTOR
RONALD E. BOWLES

BY Hurvitz & Rose
ATTORNEYS

INVENTOR
RONALD E. BOWLES
BY Hurvitz & Rose
ATTORNEYS

INVENTOR
ROMALD E. BOWLES

BY Hurvitz + Rose

ATTORNEYS

INVENTOR
RONALD E. BOWLES
BY Hurvitz + Rose
ATTORNEYS

United States Patent Office 3,621,861
Patented Nov. 23, 1971

3,621,861
FLUIDIC AMPLIFIERS WITH ADAPTIVE GAIN AND/OR FREQUENCY RESPONSES

Romald E. Bowles, Silver Spring, Md., assignor to Bowles Fluidics Corporation, Silver Spring, Md.

Filed Nov. 12, 1969, Ser. No. 875,663
Int. Cl. F15c 3/00
U.S. Cl. 137—81.5 78 Claims

ABSTRACT OF THE DISCLOSURE

Techniques are disclosed wherein symmetry of operation, gain and/or frequency response characteristics of fluidic amplifiers may be selectively varied. In one technique an amplifier vent passage is provided with one or more inserts which change in size and shape in response to temperature and/or qualitative composition of the working fluid, the latter two parameters being selectively variable to change the flow impedance of the vent passage. Another technique employs a similar insert in a fluidic capacitor connected to the amplifier output passage, whereby the capacity of the output passage, and hence the frequency response of the amplifier, is selectively variable with either working fluid temperature or working fluid qualitative composition. In still another technique the Reynolds number of a power stream in a turbulence amplifier is selectively varied by varying fluid temperature, pressure and/or qualitative composition, whereby to vary the sensitivity of the power stream to turbulence in response to different input signal frequencies. In another technique fluidic capacitors, connected to the input and/or output passages of a fluidic amplifier, are selectively varied by introducing variable quantities of control fluid into the capacitors; the variable capacity provides corresponding variable amplifier frequency response characteristics. In another technique, the power stream pressure in a fluidic amplifier is automatically varied to maintain the minimum power stream pressure necessary to provide a linear amplifier gain characteristics for varying input signal ranges.

BACKGROUND OF THE INVENTION

The present invention relates to self-adaptive fluidic amplifiers, and more particularly to fluidic amplifiers having selectively variable symmetry of operation, gain and/or frequency response characteristics.

I have previously described various self-adaptive fluidic systems and elements in my following co-pending U.S. patent applications:

(1) Ser. No. 676,262, filed Oct. 18, 1967, now U.S. Pat. No. 3,542,048 and entitlde "Self-Adaptive Systems";

(2) Ser. No. 738,540, filed June 20, 1968 and entitled "Adaptive Fluidic Function Generators";

(3) Ser. No. 4,315, filed Jan. 20, 1970 and entitled "Fluidic Systems Having Adaptive Gain Dependent on Input Signal Parameters."

The feature of self-adaptability enables a system to: (a) optimize its own performance when operating under anticipated operating conditions; (b) accommodate changes in operating requirements; and (c) extend the system operating range to provide performance capabilities of a system not originally anticipated. Generally, a controll system can be described mathematically by transfer functions which relate the input and output signals. In a conventional system, this transfer function is a compromise selected by the designer and is fixed at the time the system is assembled. The fixed transfer function enables the system to operate adequately within an anticipated range of operating conditions. The conventional system also provides optimized performance for selected points within this range, these points corresponding to the designer's original predictions of the most probable or the most frequently encountered operating conditions. In an adaptive control system of the type with which this invention is concerned, these transfer functions can be modified on command while the system is operating.

The present invention is concerned with techniques for modifying gain characteristics and/or frequency response characteristics of fluidic elements and circuits. In presenting this description, in most instances the amplifier characteristics are varied in response to a variable performance command signal. The performance command signal generally represents an evaluation of some parameter or characteristic of a system to be controlled, and is generated by any number of techniques which per se do not constitute part of the present invention. Some of these techniques are disclosed in my above-referenced co-pending U.S. Patent Application Ser. No. 4,315. For present purposes, it will be assumed that a command signal is provided as an evaluation of the operation of system performance, and the means for providing such signal will not be considered except to the extent that they are incorporated by reference to the aforesaid applications.

While the primary utilization of the invention disclosed herein is intended for self-adaptive systems, it will be apparent to those skilled in the art that the performance command signals utilized herein to vary the amplifier characteristics need not necessarily originate as system performance measurements, but rather may be provided from controls actuable independently of the system in which the amplifier element or circuit is operating.

It is therefore a broad object of the present invention to provide fluidic amplifiers having selectively variable gain characteristics.

It is another object of the present invention to provide fluidic amplifiers having selectively variables frequency response characteristics.

It is another object of the present invention to provide a selective asymmetrical operation capability for fluidic amplifiers.

It is another object of the present invention to provide fluidic amplifiers operable with a fluid medium and having gain and/or frequency response characteristics which are selectively variable in response to variations of predetermined parameters of the working fluid.

It is still another object of the present invention to provide a fluidic amplifier in which the flow impedance of amplifier vent passages is selectively variables in response to temperature and/or qualitative composition of the working fluid.

It is still another object of the present invention to provide turbulence amplifiers having variable frequency response characteristics in accordance with variations of the Reynolds number of the amplifier power stream.

Yet another object of the present invention is the provision of fluidic amplifiers having gain and/or frequency response and/or asymmetry characteristics which vary automatically in accordance with the history or extended operating conditions of said amplifiers.

Still another object of the present invention is to provide fluidic amplifiers having variable frequency response characterstics attained by selectively varying the capacity associated with the input and/or output passages of the amplifier.

It is still another object of the present invention to provide a fluidic amplifier in which the power stream pressure is automatically varied as necessary to maintain the amplifier gain characteristic linear for varying input signal pressures and at the same time to minimize noise level and/or power consumption.

SUMMARY OF THE INVENTION

In one aspect of the present invention, an output passage of a fluidic amplifier is divided into two flow channels, one channel being utilized to provide the amplifier output signal and the other channel being utilized as a vent passage with selectively variable flow impedance. One or more inserts may be disposed in the vent channel, the inserts being variable in size and shape in response to either changes in the temperature or changes in the qualitative composition of the working fluid of the amplifier. Variations in the flow impedance of the vent channel controls distribution of the output signal between the vent channel and output channel and thereby selectively varies the gain of the amplifier.

In another aspect of the present invention, an output passage of a fluidic amplifier is connected to a fluidic capacitor which in turn provides the amplifier output signal. An insert, which is variable in size in response to fluid temperature and/or qualitative composition, is disposed within the capacitor to provide variable capacity therefor. The frequency response and asymmetry of frequency response of the amplifier thus varies in accordance with either the temperature or qualitative composition of the working fluid and consequently with the dominance of flow to one output passage relative to flow to the other output passage.

In another aspect of the present invention a variable fluidic capacitor is connected to either the input or output passages of a fluidic amplifier thereby to selectively modify the output or input signals of the amplifier. The capacity is varied by selectively introducing a control fluid into the capacitor, the amount of the control fluid determining the capacity of the capacitor. The control fluid is such as to be non-miscible with the working fluid of the amplifier. The variable capacitors, by selectively varying the flow impedance versus signal frequency of the input and/or output passages of the amplifier, in turn selectively vary the overall frequency response characteristic of the amplifier.

In still another aspect of the present invention the frequency response of a turbulence amplifier is selectively varied by selectively varying the Reynolds number of the amplifier power stream. Specifically, it has been found that depending upon the construction of a turbulence amplifier, the power stream thereof will be more susceptible to going into turbulence in the presence of input signals at specified acoustic frequencies than at other frequencies. The sensitivity is dependent upon the diameter of the power stream, the distance between the power stream source and receiver aperture, and the Reynolds number of the stream. The Reynolds number of the power stream depends upon stream velocity, density, and viscosity, each of which parameters is selectively controllable. By selectively varying the temperature of the power stream fluid, the viscosity of the fluid is varied and hence the Reynolds number is varied. Similarly by selectively controlling the qualitative composition of the power stream fluid, the viscosity and/or density of the power stream may be controlled. Furthermore, by selectively varying the power stream supply pressure the stream velocity may be varied whereby to vary the Reynolds number of the stream. It is also to be noted that by varying the power stream pressure, in addition to changing the frequency sensitivity of the power stream, the amplitude of the amplifier output signal is simultaneously varied so that a gain control and output signal amplitude range control technique is also provided.

In still another aspect of the present invention the efficiency and signal-to-noise ratio of a fluidic device is optimized. To accomplish this, the power stream pressure of the amplifier is varied in response to input signal pressures so as to maintain the power stream pressure only slightly greater than necessary to maintain the amplifier gain characteristic linear. Since the slope of the power stream velocity profile remains constant over a substantial range of power stream pressures, minimizing the power stream pressure in accordance with input signal conditions does not change the gain of the amplifier but does permit reduction in power consumption and elimination of noise produced by high pressure power streams.

BRIEF DESCRIPTION OF THE DRAWINGS

The above and still further objects, features and advantages of the present invention will become apparent upon consideration of the following detailed description of several embodiments thereof, especially when taken in conjunction with the accompanying drawings, wherein.

DESCRIPTION OF THE PREFERRED EMBODIMENTS

Figure 1:
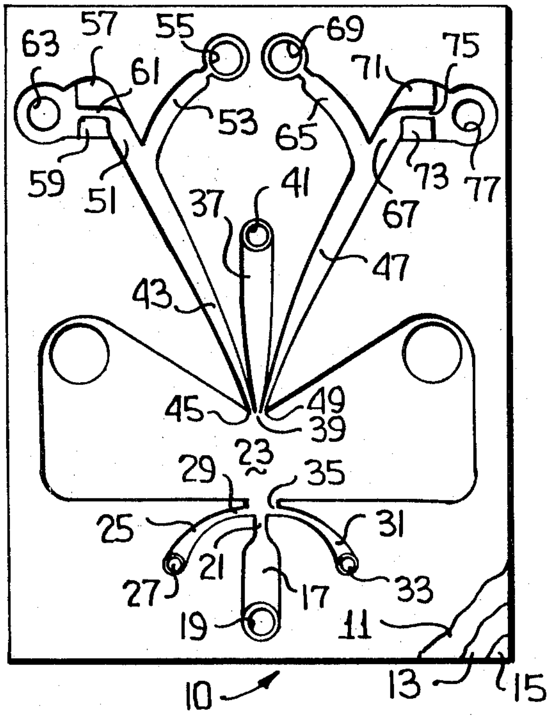
FIG. 1 is a plan view of a fluidic amplifier employing a pair of opposed fluid temperature—and/or fluid composition-sensitive inserts for varying the symmetry of operation and gain characteriestic of the amplifier.

Referring now to FIG. 1 of the accompanying drawings there is illustrated an amplifier 10 comprising a sandwich of three plates, a top plate 11, a middle plate 13, and a bottom plate 15. The middle plate 13 is cut-out to provide the configuration of the amplifier, and the top and bottom plates are respectively sealed thereto by suitable means such as adhesive or machine screws to provide fluid-tight covers for the cut-out configuration.

A power nozzle 17 has an aperture 19 at one end thereof adapted to receive pressurized fluid. The other end of nozzle 17 is formed into a throat or orifice 21 which is adapted to issue a power stream of fluid into an interaction region or chamber 23 in response to application of pressurized fluid to orifice 19.

A left control nozzle 25 has an aperture 27 at one end thereof adapted to receive a control signal pressure. The other end of nozzle 25 is formed into a throat or orifice 29 which is adapted to issue a control stream of fluid in response to application of a control signal to orifice 27. The control stream of fluid is directed to strike the power jet after the latter has issued from throat 21.

A right control nozzle 31 is similarly provided with an aperture 33 which is adapted to receive a further control signal pressure, and with a throat 35 which issues a control stream of fluid into interaction region 23 in response to a control signal applied at orifice 33. The control stream issued from right control nozzle 31 is directed to strike the power stream after it has issued from throat 21. Amplifier 10 is substantially symmetrical about the center line of power nozzle 17 and therefore the throats 29 and 35 of left and right control nozzles 25 and 31 respectively are axially aligned and opposed to one another. Symmetry in an amplifier is of course a design consideration and therefore the particular relationship of control nozzles 25 and 31 in amplifier 10 is not to be construed as limiting the scope of the present invention.

At the opposite end of the interaction region 23 from throat 21 are three output passages. A center output passage 37 has an ingress orifice 39 which is axially aligned with the throat 21 of power nozzle 17, and an egress orifice 41 which is normally open to the atmosphere or ambient pressure environment. Output passage 37 may therefore be considered a dump passage.

A left output passage 43 has an ingress orifice 45 which is to the left of the common center line of power nozzle 17 and central output passage 37. A right output passage 47 has an ingress orifice 49 which is to the right of the common center line of power nozzle 17 and central output passage 37, left and right output passages 43 and 47 being symmetrically disposed with respect to said common center line.

When the power stream of fluid initially issues from the throat 21 of power nozzle 17, it primarily flows through the interaction region 23 into the center output passage 37 and is dumped to the ambient environment. If a control stream of fluid is issued from left control nozzle 25 it impinges on the power stream and by momentum interchange deflects the power stream toward the right output passage 47. Similarly if the control stream of fluid issues from right control nozzle 31 it impinges on the power stream and by momentum interchange deflects the power stream toward left output passage 43. If the control streams issue concurrently from both the right and left control nozzles 31 and 25 respectively, the deflection of the power stream is a function of the difference between the control stream momenta. In general, the angular deflection of the power stream of fluid will be a function of the nozzle area and of the velocity, density and direction of the interacting streams of fluid.

A velocity gradient exists transversely through the power stream of fluid. The velocity (and pressure) is at a maximum at the center of the power stream and at a minimum at the stream boundary due to the extreme boundary interactions with the ambient fluid in the interaction region 23. Thus, as the power stream is progressively deflected toward passage 43 or 47 a progressively higher pressure is developed in that passage until the center of the power stream is received by that passage.

Left output passage 43 extends away from interaction region 23 and bifurcates into the left vent channel 51 and a left output channel 53. Left output channel 53 has a constricted output aperture 55 which may be a control nozzle of a load device or to which a load device may be coupled. A pair of inserts 57 and 59 are secured to opposite walls of vent channel 51. Inserts 57 and 59, formed of a material to be discussed hereinbelow, provide a flow restriction in vent channel 51 which leads to a dump aperture 63, the latter communicating with the atmosphere or with ambient pressure environment.

Right output passage 47 is similarly bifurcated to provide a right output channel 65 and a right vent channel 67. Right output channel 65 has a constricted output aperture 69, and right vent channel 67 has a pair of opposed inserts 71 and 73 secured to opposite walls thereof to define a flow restrictor 75 which communicates at its downstream end with a dump aperture 77.

Inserts 57, 59, 71 and 73 are comprised of a material which varies in size in response to variations of a parameter of the working fluid for amplifier 10. For example, the inserts may be temperature-responsive whereby to expand upon application of heat thereto and contract upon removal of heat therefrom. The heat transfer to an insert depends, in an involved fashion, upon the temperature of the fluid in the particular vent channel 51 or 67, the mass fluid flow rate through that channel, and the heat transfer coefficient of the material. The degree of expansion and/or contraction of the inserts for a given temperature variation depends on the thermal coefficient of expansion for the material comprising the inserts. The resistance to fluid flow presented by restrictors 61 and 75 therefore depend to some extent upon the temperature of the working fluid and the fluid flow rate in the respective vent channels 51 and 67.

Suitable temperature responsive material for inserts 57, 59, 71 and 73 may for example be gutta-percha, sometimes referred to as gutta rubber. The inserts themselves may be secured to the channel walls by means of a suitable adhesive. Also bi-metallic elements may be employed which upon a change in temperature extend into or retreat towards a wall of the passage. By anchoring both ends of an elongated element to a passage wall, the change in lateral position with temperature may be enhanced.

Consider the condition of equal signals applied to orifices 27 and 33 whereby to align the power stream with central output passage 37 and provide relatively small but equal fluid flows into left and right output passages 43 and 47. Distribution of the fluid flow in output passage 43 between vent channel 51 and output channel 53 depends upon the size of flow restrictor 61 which in turn is determined by the temperature and flow rate of fluid flowing in output passage 43. Similarly, distribution of fluid flow in right output passage 47 between right output channel 65 and right vent channel 67 depends upon size of restrictor 75 which in turn is determined by temperature and flow rate of fluid flowing in right output passage 47. The particular amplifier 10 illustrated in FIG. 1 is assumed to be symmetrical and therefore it is assumed that for equal fluid temperatures and flow rates the sizes of restrictors 61 and 75 are equal. With the power stream centered on central output passage 37, restrictors 61 and 75 are affected equally. If, however, the control signal applied to right control nozzle 35 increases, the fluid flow in left output passage 43 becomes greater than the fluid flow in right output passage 47. The increased flow in left output passage 43 increases the flow correspondingly in left vent channel 51 and left output passage 53. Similarly the decreased fluid flow in right output passage 47 decreases the fluid flow in right output channel 65 and right vent channel 67.

Since heat transfer to the inserts depends in part on flow rate, increased fluid flow in left vent channel 51 produces over a period of time an increase in the size of inserts 57 and 59 whereby to reduce the size of flow restrictor 61. This, of course, is based on the assumption, carried through in the following discussion, that the working fluid is at a somewhat higher temperature than the ambient temperature of vent channels 51 and 67. The gradual reduction of the size of the restrictor 61 gradually changes the proportion by which flow in left output passage 43 divides between vent channel 51 and output channel 53, effectively changing the gain from that output passage of the amplifier. more specifically, as the power stream is deflected toward output passage 43, the output signal provided at output orifice 55 changes quickly as a function of the transverse pressure gradient of the power stream but also gradually changes historically (i.e.—on the basis of past operation) with the increased restriction to fluid flow through restrictor 61 by virtue of the history of increased flow in left output passage 43. The gain can be further increased by increasing the temperature of fluid supplied to power nozzle 21. Conversely, gain decrease may be achieved by reducing the temperature of fluid applied to nozzle 21.

The decrease in flow experienced in right output passage 47 by virtue of deflection of the power stream toward left output passage 43 provides an opposite historic effect at output orifice 69 than was achieved at output orifice 55. More specifically, the decreased flow into right vent channel 67 over a period of time produces a cooling and associated contraction of inserts 71 and 73 to enlarge flow restrictor 75. The fluid in right output passage 47 is thus proportioned so that a greater proportion of fluid flow is directed toward vent channel 67 after the cooling effect than prior to the cooling effect. If, for the moment, we assume amplifier 10 to be part of a control system in which the output signals comprising the pressures at output orifices 55 and 69 perform a control function which is optimized when the pressures at orifices 55 and 69 are equal, and that the signals applied across left and right control nozzles 25 and 31 respectively represent the monitored control function and reflect control optimization when both such signals are of equal pressure, it is seen that with extended operation in an unbalanced mode the gain of amplifier 10 becomes asymmetrical in a direction attempting to provide an output signal which compensates for the history of continued imbalance of the input signal. Of course, this is merely one utilization of the amplifier 10 and is not to be construed as limiting.

The degree of the gain changing effect in amplifier 10 may be adjusted by increasing or decreasing the power stream temperature at the source of pressurized fluid as for instance a steam turbine (not illustrated) or alternatively by decreasing or increasing the ambient temperature of the overall structure of amplifier 10. Thus it is evident that gain variations may be provided independently of the differential pressure across control nozzles 25 and 31 by selectively varying either the power stream fluid temperature or the ambient temperature. The response speed of the adaptive gain feature of amplifier 10 is determined by exposed surface area of inserts 57, 59, 71 and 73. More specifically, it is clear that the rate of heat transfer to and from the inserts depends to some extent on the surface area of the inserts which contacts the fluid medium, and therefore, the speed of response of the inserts to temperature changes in the fluid is a function of this exposed surface area. Thus use of materials with large surface areas, for instance, foamed material, is of value in those instances where a short time history effect is desired while conversely a small exposed surface area is appropriate where an integration-type response over a long time period is desired. Other factors which control the response speed of the adaptive gain feature of amplifier 10 are the thermal conductivity of the inserts, and the degree of thermal insulation between the inserts and the remainder of the amplifier structure in cases where the overall amplifier structure is to be controllably heated or cooled to provide the adaptive gain feature. In general, but not necessarily, the insert response time should be relatively long as compared to the amplifier dynamic response time so that the inserts respond to longer term average conditions while the amplifier itself responds to short term higher frequency signals. By amplifier dynamic response time is meant that time required for the effect of an input signal variation to be manifested as an output signal variation.

In summary then it is seen that by varying the effective cross section area of the vent channel 51 or 67 as the case may be, the fraction of the deflected power jet which is lost to the atmosphere or ambient pressure and not available to the output aperture may be responsively varied, and thereby the gain or ratio of pressure developed at the output aperture to the pressure applied to the input of the control throat may be responsively varied.

It is to be noted that inserts 57, 59, 71 and 73 need not necessarily be temperature-responsive but may also respond to other parameters of the working fluid. In particular, the inserts may be responsive to the qualitative composition of the working fluid so that the inserts increase or decrease in size in response to insertion of controllable amounts of chemical additives to the working fluid. For example, the inserts may be comprised of a hydroscopic material such as soft nylon or dycril. Such material swells in response to water and contracts in response to ammonia fumes. Thus, where pressurized air is the working fluid medium, a pulse of water vapor added to the power stream will cause an increase in the flow resistance provided by restrictors 61 and 75. A pulse of ammonia fumes similarly produces a decrease in the flow resistance presented by these restrictors. A dual additive system may thus be utilized to selectively vary the amplifier gain. Likewise, a single additive may be so employed, the additive producing a transient gain change by virtue of the fact that the pressurized air tends to dry the inserts and restore their original configuration.

Figure 2:
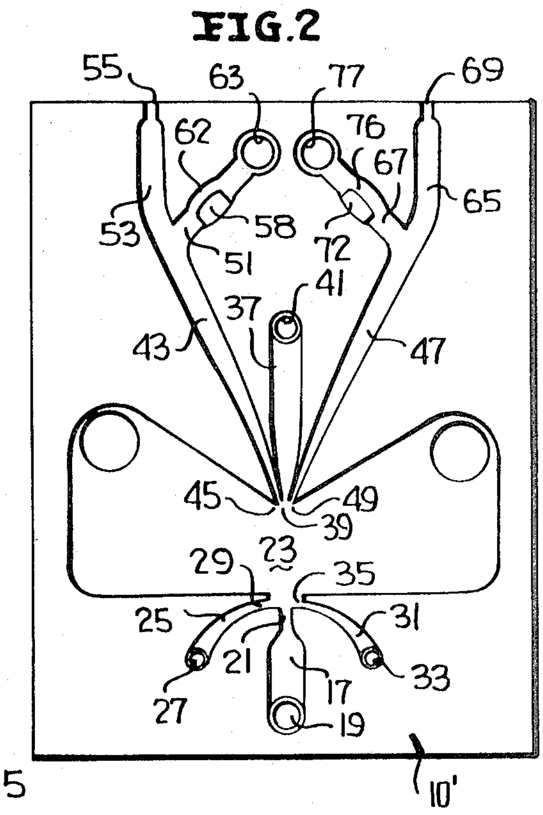
FIG. 2 is a plan view of a fluidic amplifier having a single insert in each amplifier vent pasage, the insert being variable in size in response to either fluid temperature or fluid composition to vary the gain characteristic of the amplifier.

Referring now specifically to FIG. 2 of the accompanying drawings there is illustrated a fluidic amplifier 10' which is somewhat similar to amplifier 10 but in which only one insert is employed in each of the amplifier vent channels. The elements of amplifier 10' of FIG. 2 which correspond to the elements of amplifier 10 of FIG. 1 are provided with identical reference numeral designations. The only substantial difference in the amplifier 10 and 10' is the fact that a single insert 58 is secured to a wall of left vent channel 51 to provide a flow restriction 62 between the opposite channel wall and the insert. Similarly a single insert 72 is secured to a channel wall of right vent channel 67 to provide a flow restriction 76 between the opposite channel wall and the insert. Inserts 58 and 72 may be responsive to either temperature or qualitative composition of the working fluid to selectively adjust the gain of amplifier 10' in a manner similar to that described for amplifier 10 of FIG. 1.

Figure 3:
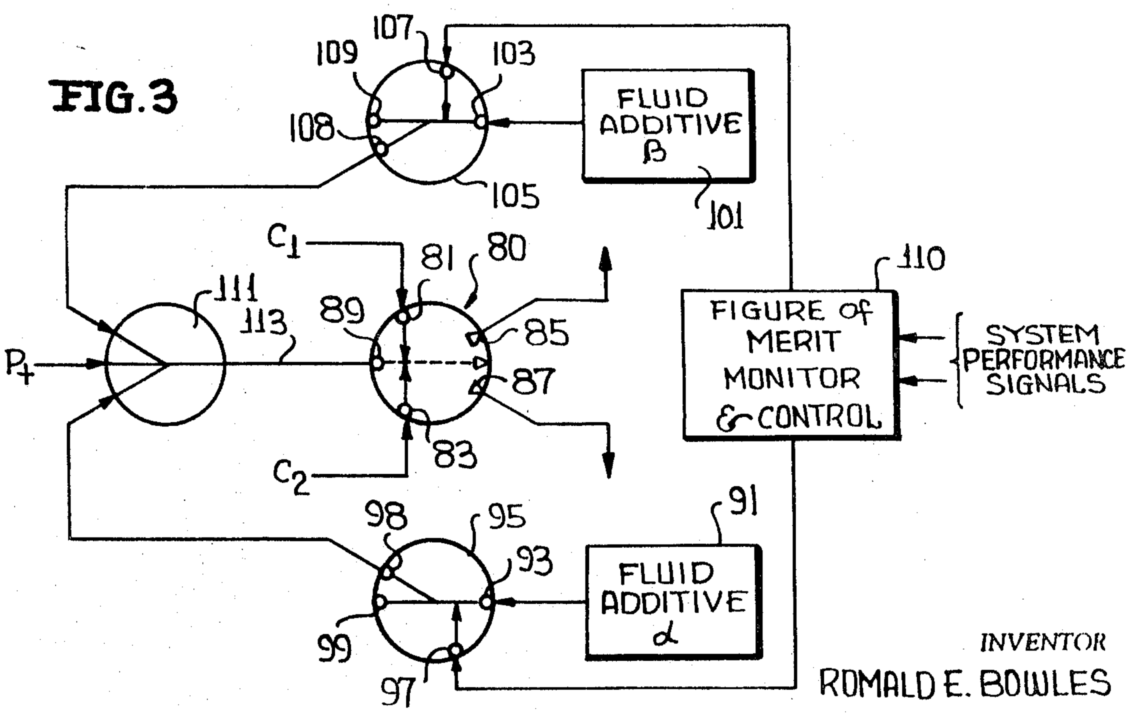
FIG. 3 is a schematic diagram of an adaptive fluidic system utilizing the amplifiers of FIGS. 1, 2 or 4 herein.

Referring now specifically to FIG. 3 of the accompanying drawings there is provided a schematic diagram illustrating how either of amplifiers 10 or 10' may be utilized as an adaptive element in a fluidic control system. A fluidic amplifier 80, corresponding to either of amplifiers 10 or 10' of FIGS. 1 and 2 respectively, receives control signals $C_1$ and $C_2$ at left and right control nozzles 81 and 83 respectively. Amplifier output signals are provided across left and right output channels 85 and 87 and the amplifier receives pressurized working fluid at power nozzle 89. For the purposes of the circuit of FIG. 3 it is assumed that amplifier 80 has a gain characteristic which is variable in response to the qualitative composition of the pressurized fluid applied to power nozzle 89. More particularly, it is assumed that the inserts 57, 59, 71 and 73 of FIG. 1 (or inserts 58 and 72 of FIG. 2) respond to contact with a first fluid, $\alpha$, by expanding and respond to a second fluid, $\beta$, by contracting.

A source 91 of pressurized fluid $\alpha$ is connected to a power nozzle 93 of a fluidic OR gate 95. OR gate 95, by way of example, may be of the type illustrated in U.S. Pat. No. 3,240,219. Similarly, a pressurized source 101 of fluid $\beta$ is applied to a power nozzle 103 of fluidic OR gate 105. OR gate 105 may be of the same type as OR gate 95. OR gates 95 and 105 have respective control nozzles 97 and 107, respective NOR output passages 99 and 109 and respective OR output passages 98 and 108. In the absence of a control signal applied to control nozzle 97 of OR gate 95 the pressurized fluid $\alpha$ is directed to output passage 99 thereof. Similarly, in the absence of a control signal applied to control nozzle 107 of OR gate 105 the pressurized fluid $\beta$ is applied to NOR output passage 109. Input signals are provided to control nozzles 97 and 107 of respective OR gates 95 and 105 respectively from a figure of merit monitor and control circuit 110. Circuit 110 receives signals indicative of system performance from the system being controlled by amplifier 80 and compares the information provided by the signals to a desired system performance criteria. When the system is not operating in accordance with desired criteria, fluid signals or pulses at appropriate frequencies are transmitted to appropriate ones of control nozzles 97 and 107 of OR gates 95 and 105 respectively. Circuit 110 of itself does not form part of the present invention; rather the circuit may take the form of one of the embodiments or modification thereof disclosed in my above-referenced co-pending U.S. patent application Ser. No. 4,315.

The OR output passages 98 and 108 of OR gates 95 and 105 respectively are connected to respective input ports of a fluid flow combiner element 111, the latter serving to combine fluid flows applied thereto in a common output passage 113. Also applied as an input signal to combiner element 111 is the pressurized working fluid (P+) for amplifier 80. The pressurized working fluid is therefore continuously applied to power nozzle 89 of amplifier 80 while the fluids $\alpha$ and $\beta$ are selectively applied to the power nozzle 89 in accordance with the application of control signals to control nozzles 97 and 107 of OR gates 95 and 105.

In operation of the system illustrated in FIG. 3, the figure of merit monitor and control circuit 110 responds to variations in system performance from a predetermined norm by applying fluid pulses to one or the other of OR gates 95 and 105. For example, assume that additive $\alpha$ acts to enlarge and additive $\beta$ acts to shrink the inserts in the vent passages of amplifier 80. In accordance with whichever additive is added to the working fluid, the gain of the amplifier 80 may be selectively adjusted in steps. To increase the gain of amplifier 80, circuit 110, one would apply control pulses to control nozzle 97 whereby to add fluid additive $\alpha$ to the working fluid. The number of additive pulses required depends of course upon how far the actual system performance has strayed from the desired system performance. To decrease the gain of amplifier 80 as commanded by the circuit 110, OR gate 105 permits selective application of fluid additive $\beta$ pulses to the working fluid.

It is interesting to note that the circuit of FIG. 3 enables one to continuously monitor the performance of the control system and correct that performance as necessary. Specifically, one could perturb the control system, with a low level pressure signal applied to the control nozzles 81 and 83, examine its response based on the established figure of merit at circuit 110, and apply a pulse of fluid additive $\alpha$. The system could then be perturbed again and the performance monitored by circuit 110. If the performance improved over that monitored in response to the initial perturbation, another pulse of fluid additive $\alpha$ would be in order. If, however, instead of the performance improvement of a performance deterioration was sensed, a pulse of fluid additive $\beta$ would be applied to the amplifier. Optimum system performance could thus be maintained by periodic perturbations of the system, monitoring the response to such perturbations, and applying the appropriate additive to adjust the performance of amplifier 80 in the appropriate sense.

It is also possible to utilize a single fluid additive which would be pulsed periodically into the system wherein the effect of the additive would be a decaying effect. For example, where the working fluid is air, a water pulse would cause a swelling of insert material such as dycril, which would then shrink in response to air flow subsequent to the water pulse and gradually remove the effect of the water pulse from the material. In this single fluid additive application, the additive pulse rate can be adjusted by the system figure of merit circuit 110 to optimize system performance. Further, the pulses can be inserted selectively at various portions of the system, such as directly into an insert for example, so as not to effect every component to an equal degree but rather to effect each component as desired.

Figures 4, 5, 6:
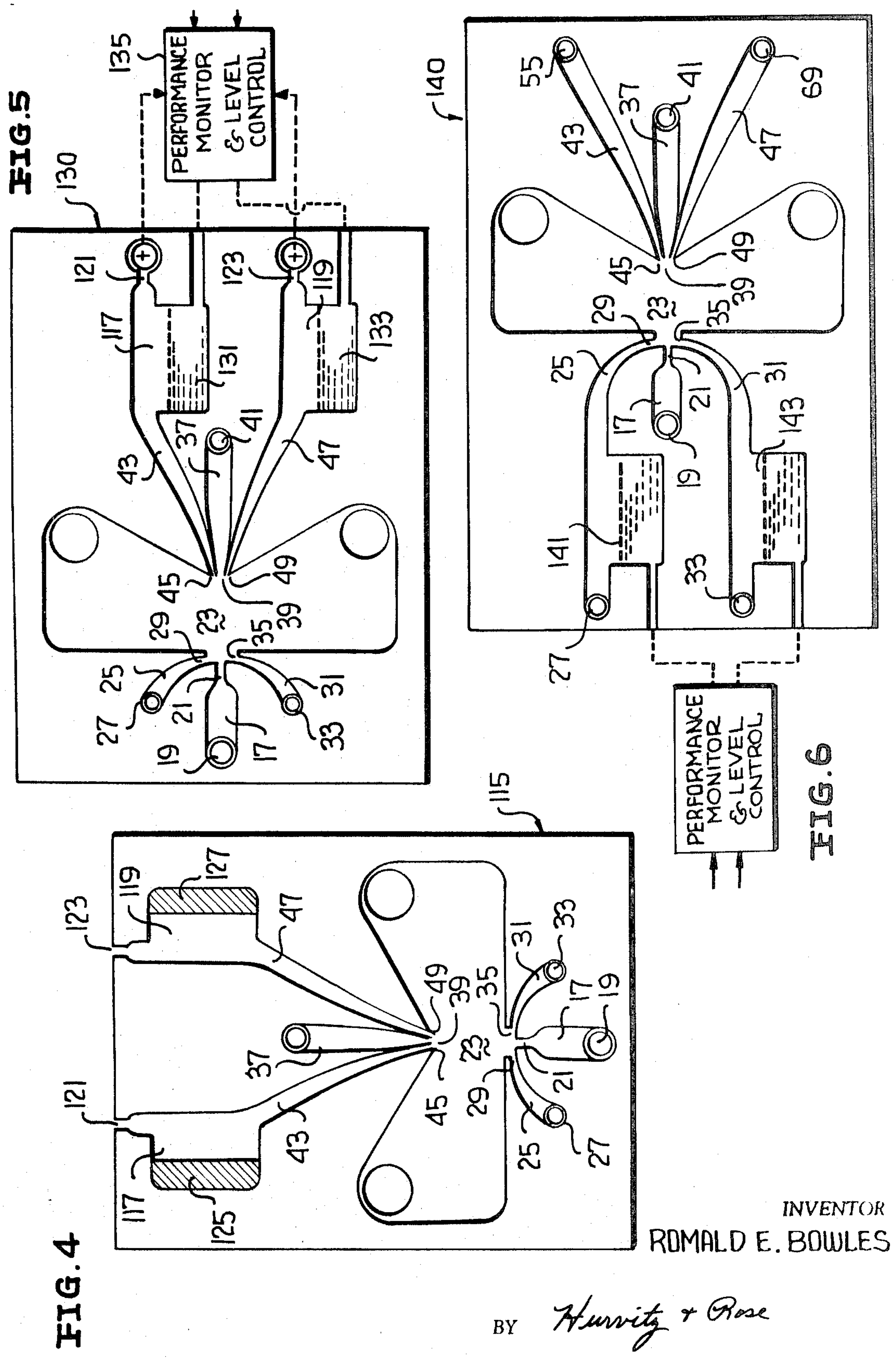
FIG. 4 is a plan view of a fluidic amplifier employing output capacitors having fluid temperature-sensitive and/or fluid composition-sensitive inserts disposed therein for varying the capacity of the amplifier output passage.
FIG. 5 is a fluidic amplifier having fluidic capacitors connected to the amplifier output passages, the capacity of the capacitors being variable by selectively varying the level of control fluid in the capacitors.
FIG. 6 is a plan view of an amplifier similar to that of FIG. 5 wherein the variable capacitors are disposed in the input passages of the amplifier.

Referring now to FIG. 4 of the accompanying drawings there is illustrated a fluidic amplifier 115 having a selectively variable output signal amplitude versus frequency response characteristic. Amplifier 115 is, to a large degree identical to amplifier 10 of FIG. 1 and the elements which are identical to both amplifiers are provided with identical reference numeral designations. Amplifier 115 departs from identity with amplifier 10 insofar as left and right output passages 43 and 47 respectively are not bifurcated but rather are integral output passages which feed respective fluidic capacitors 117 and 119. The output signals for amplifier 115 are derived from left and right output orifices 121 and 123 respectively, orifice 121 being fed directly from capacitor 117 and orifice 123 being fed directly from capacitor 119.

Disposed within capacitor 117 is a mass of material 125 which in accordance with the principles of the present invention may be responsive either to changes in temperature qualitative composition of the working fluid of amplifier 115 to change in size or compliance and thereby change the capacity of capacitor 117 accordingly. A similar mass of material 127 is provided in capacitor 119. The materials 125 and 127 may be the same as that comprising the inserts 57, 59, 71 and 73 in FIG. 1.

Fluidic capacitors 117 and 119 are in effect connected in parallel across respective output passages 43 and 47. The fluidic capacitors effectively act as low pass filters for respective signals passing between output passage 43 and orifice 121 and between output passage 47 and orifice 123. In other words, signals below a predetermined frequency will pass unaltered between passage 43 and orifice 121 (and between passage 47 and orifice 123). For signals above this predetermined frequency, capacitors 117 and 119 tend to impede the signal more and more, the degree of impedance being dependent upon the frequency of the signal. The predetermined frequency below which the output signal is substantially unaltered is determined by the capacity of capacitors 117 and 119. By selectively increasing or decreasing the size or compliance of the mass of material 125 in capacitor 117, the capacity of the capacitor is varied accordingly and hence the predetermined frequency or cut-off frequency of that output leg 121 is also varied. The mass of material 125 may thus be utilized to vary the frequency response characteristic of one output leg of the amplifier 115 of FIG. 4. A similar analysis can be made with respect to the effect of varying the size or compliance of mass of material 127 in fluidic capacitor 119 as relates to the output signal provided at right output orifice 123 of amplifier 115. Where materials 125 and 127 are temperature-responsive, adaptive control of amplifier 115 may be implemented by selectively heating or cooling the environment surrounding amplifier 115, or by selectively heating or cooling the pressurized working fluid applied to power nozzle 17. Where inserts 125 and 127 are responsive to the qualitative composition of the working fluid, the fluid additives, such as those described above in relation to FIGS. 1 and 2, may be selectively introduced into the working fluid to vary the frequency response characteristic of the amplifier accordingly.

The amplifier of FIG. 4 may be suitably employed in the circuit of FIG. 3 when it is desired to symmetrically or asymmetrically control the frequency response of an amplifier in accordance with the performance of a control system. With regard to the amplifiers of FIGS. 1, 2 and 4, it is to be noted that when the respective inserts are responsive to qualitative composition of the working fluid, the gain characteristic (in the case of the amplifiers of FIGS. 1 and 2) and the frequency response characteristic (in the case of amplifier of FIG. 4) may be varied symmetrically when the power stream is aligned with the central output passage 37 of the amplifier. The respective characteristics may be varied asymmetrically when the power stream, on a history-weighted basis, is deflected toward one or the other of left and right output passages 43 and 47 respectively. More specifically, it is clear that insertion of a fluid additive into the working fluid has a greater effect on the inserts associated with whichever of the left and right output passages is receiving a greater flow rate from the power stream at that particular time. Where the flow rates to left and right output passages 43 and 47 respectively are equal, the insertion of the fluid additive affects the inserts associated with both output passages equally and hence the characteristic in question is changed symmetrically. Where the inserts associated with one output passage are affected differently from the inserts associated with the other output passage, the characteristic in question, be it gain or frequency response, is varied asymmetrically.

It is also to be understood that a combination of the features provided in FIGS. 1 and 2 and FIG. 4 may be utilized whereby the gain, capacitance and/or flow resistance in a single amplifier can be varied in accordance with variations in temperature or variation in the qualitative composition of the working fluid.

Referring now specifically to FIG. 5 of the accompanying drawings there is illustrated a fluidic amplifier 130 which is similar to amplifier 115 of FIG. 4 and has like elements designated by like reference numerals for amplifier 115. Amplifier 130 departs from similarity with amplifier 115 in so far as the left and right fluidic output passage capacitor 117 and 119 respectively do not have a mass of material inserted therein. Rather, the fluidic capacitors 117 and 119 are selectively variable by selective introduction of control fluid 131 and 133 respectively therein. The depth of control fluid 131 in capacitor 117 determines the capacity of the capacitor and in like manner the depth of control fluid 133 in capacitor 119 determines the fluid capacity of capacitor 119. The fluid 131 and 133 is preferably heavier than the working fluid of amplifier 130, and more importantly is of different compressibility than the working fluid and is substantially non-miscible therewith. Typical examples for the working and control fluids utilized in the amplifier of FIG. 5 would be air for the working fluid and water for the control fluid. In some cases the control fluid may be gaseous if it is sufficiently heavier and non-miscible with the working fluid. For cases where the working fluid is liquid and the control fluid is gaseous the orientation of amplifier 130 should be opposite that shown in order to permit gas pockets for retention of control fluid.

In operation of the amplifier 130, capacitor 117 and 119 are generally partially filled with control fluid at the start of operation. The level of control fluid is controlled from externally of the amplifier as by a performance monitor and liquid level control unit 135. Unit 135 may take the form of one of the embodiments disclosed in my co-pending U.S. patent application Ser. No. 4,315, responding to a specified system parameter for controlling fluid level in the capacitors. Of course the levels of control fluid 131 and 133 need not necessarily be dependent upon system performance but may be selectively controlled in accordance with other criteria and considerations. As was the case with amplifier 115 of FIG. 4 the variations in capacitance of capacitors 117 and 119 independently change the frequency response of the two output legs of the amplifier. It is apparent that when the capacitors 117 and 119 are full the amplifier will pass a much higher frequency signal unattenuated than when capacitors 117 and 119 are relatively empty of control fluid. Thus the control fluid level in capacitors 117 and 119 control the break point or cut-off frequency of the amplifier. A similar effect may be obtained by using a piston whose position is adjustable in the capacitor rather than employing a control fluid. However, a piston arrangement requires moving elements and departs from the concept of a fluidic system. The advantages of fluidic systems, namely reliability and long life of components is an important consideration, making control fluid concept more desirable than a piston-type control.

Referring now to FIG. 6 of the accompanying drawings there is illustrated a fluidic amplifier 140 which is provided with a variable frequency response by employing the same basic principles of amplifier 130 of FIG. 5, but wherein the fluidic capacitors 141 and 143 are employed in parallel (so far as the circuit performance is concerned) with the input passages rather than with the output passages. The elements in amplifier 140 which are identical with elements in amplifier 130 are designated by like reference numerals. The differences in amplifiers 130 and 140 reside in the fact that the output passages 43 and 47 of amplifier 140 feed directly to output orifices 55 and 69 respectively without communicating with fluidic capacitors; in addition fluidic capacitors 141 and 143 are connected in parallel relationship with respective input passages of the amplifier. More specifically, capacitor 141 is connected between left input orifice 27 and left throat 29 of left control nozzle 25. Similarly, fluidic capacitor 143 is connected in parallel with right control nozzle 31 between input orifice 33 and throat 35.

The capacitors 141 and 143 are provided with adjustable depths of control liquid for the purpose of varying their fluid capacity, much in the same manner as is done for capacitors 117 and 119 in FIG. 5. As is the case with capacitors 117 and 119 of FIG. 5, the control fluid level in capacitors 141 and 143 may be synchronized so as to always have the same control fluid depth or in the alternative may be independently operable to provide any desired relative capacity values. It is clear that higher frequency components of input signals applied to input orifices 27 and and 33 respectively are attenuated according to the control fluid depth in capacitors 141 and 143, and therefore the output signal provided at output orifices 55 and 69, because of its dependence upon the amplitude of the input signals at the throats 29 and 35, exhibits a frequency response characteristic for amplifier 140 which is dependent upon control fluid levels in the capacitors 141 and 143.

Figure 7:
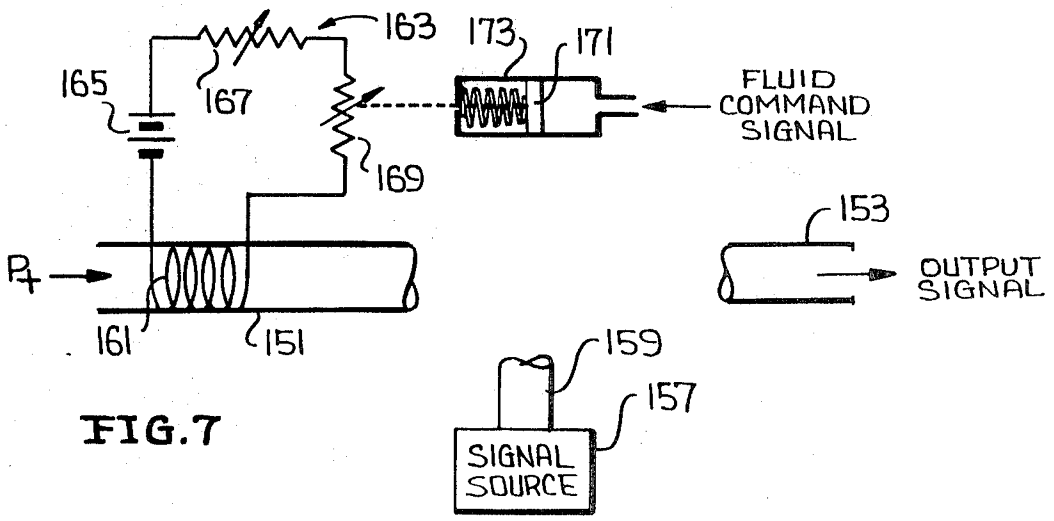
FIG. 7 is a schematic illustration of a turbulence amplifier in which the fluid power stream is selectively heated by means of an electrical heating element to vary the stream Reynolds number.

Referring now to FIG. 7 of the accompanying drawings there is schematically illustrated a turbulence amplifier having a selectively variable frequency response characteristic. The amplifier comprises a source of pressurized fluid P+ adapted to supply fluid at a low Reynolds number to a supply tube 151. The tube 151 when taken in conjunction with the Reynolds number of the fluid, is of such a diameter and length as to produce laminar flow in a power stream issued therefrom. Downstream and coaxial with tube 151 is a fluid receiver tube 153. Receiver tube 153 is positioned relative to tube 151 such that in the absence of a control signal the power stream issued from tube 151 is laminar when it arrives at receiver tube 153 and therefore a large proportion of the stream flows into the receiver.

A control signal source 157 is adapted to supply a low level A.C. or D.C. fluid control signal to a control tube 159 in accordance with certain input intelligence. The control signal issuing from control tube 159 impinges on the power stream issuing from source tube 151 and induces turbulence therein. Turbulent spreading of the power stream in response to the control signal greatly reduces the flow received by receiver tube 153.

It is known that the sensitivity of the turbulence amplifier power stream to control signals (that is the susceptibility of the power stream to be rendered turbulent in response to a given level of control signal) is dependent upon the Reynolds number of the power stream. It has been found that for a power stream of a given Reynolds number, the stream is more sensitive to input signals at predetermined frequencies, which frequencies are usually in the acoustic frequency range. Thus, for example, the power stream may be rendered turbulent in response to a 12 kc. control signal of a given amplitude but not in response to a 10 kc. signal of the same amplitude. Moreover, there may be a number of sensitive frequencies for the power stream within the acoustic range. It has been found that by varying the Reynolds number of the power stream, not only is the amplitude sensitivity of the power stream changed but also the frequencies to which the power stream is sensitive or most sensitive changes accordingly. For example, a power stream which at one Reynolds number be highly sensitive to a 15 kc. signal and somewhat less sensitive to a 12 kc. signal may find its sensitivity reversed in response to a change in the Reynolds number of the power stream.

The Reynolds number of a fluid stream depends, inter alia, on the characteristic dimension, velocity, density and viscosity of the fluid stream. In the circuit of FIG. 7 the viscosity of the power stream issuing from supply tube 151 and hence the Reynolds number thereof is controlled by selectively varying the temperature of the stream. This is achieved by means of an electrical heating element 161 disposed either within or about supply tube 151 and selectively actuable by an electrical circuit 163. Electrical circuit 163 comprises a source of electrical voltage 165, a variable resistor 167, and a further variable resistor 169, all connected in series with heating element 161. The function of variable resistor 167 is to provide a manual adjustment of the current flowing through circuit 163 so as to permit the operator to control the heating action of heating element 161. Variable resistor 169 has its slider arm mechanically linked to a fluid-driven spring-loaded piston 171 in piston chamber 173. The piston position within chamber 173 is selectively varied by means of a fluid command signal applied at one end of the chamber, the fluid command signal acting to displace the piston and consequently the slider arm of variable resistor 169 as a function of the command signal amplitude. The fluid command signal may be, by way of example, measurement of system performance in some respect, which performance is intended to effect a change in the gain and frequency sensitivity characteristics of a turbulence amplifier. Depending upon the amount of current flowing through heating element 161, the fluid flowing through source tube 151 will be heated accordingly, changing the Reynolds number of the fluid; the frequency sensitivity and gain of the turbulence amplifier will, in turn, be adjusted accordingly.

Figures 8, 9:
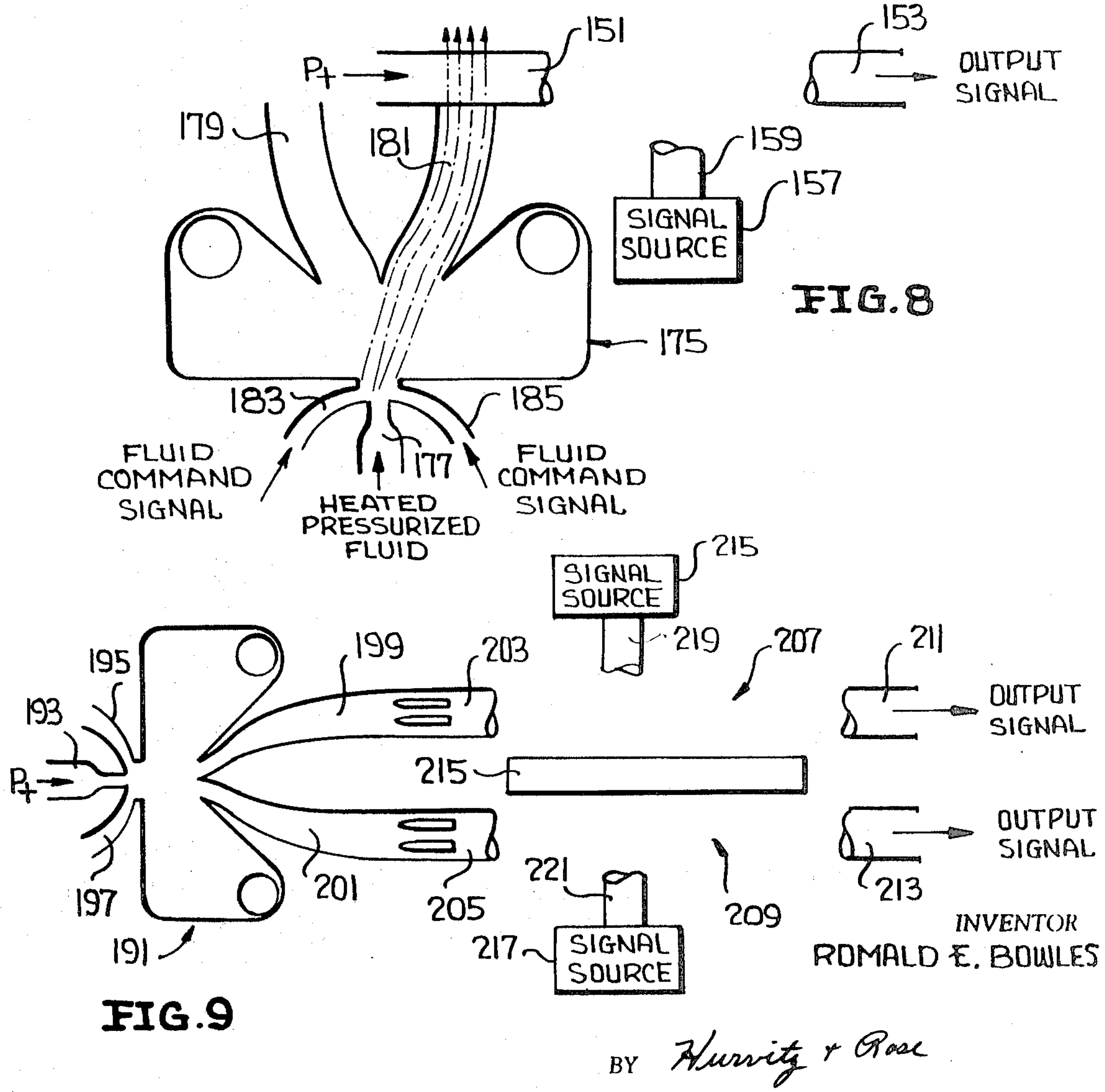
FIG. 8 is a schematic illustration of a turbulence amplifier in which the power stream fluid is selectively heated by passing heated air over the supply tube of the amplifier to vary the Reynolds number of the stream.
FIG. 9 is a schematic illustration of a turbulence amplifier in which the power stream pressure may be selectively varied to vary the frequency response characteristic of the amplifier.

Referring now to FIG. 8 of the accompanying drawings there is illustrated an alternative embodiment to that illustrated in FIG. 7 for selectively heating the fluid in supply tube 151 of the turbulence amplifier. The heating means in this case comprises a proportional fluidic amplifier 175 of the stream interaction type. Amplifier 175 has a power nozzle 177 to which is connected a source of heated pressurized fluid. Power nozzle 177 issues a power stream of the heated fluid generally toward a pair of output passages 179 and 181, the power stream being deflected more toward one or the other of the output passages in accordance with the relative strengths of fluid command signals applied to left and right control nozzles 183 and 185 respectively. Right output passage 181 is positioned such that the flow received thereby is directed over and around supply tube 151 of the turbulence amplifier. By selectively proportioning the heated power stream between passages 179 and 181 of the stream interaction amplifier 175, the heating of the fluid within supply tube 151 can be selectively controlled. As discussed above, varying the heating of the fluid in supply tube 151 varies the Reynolds number of the stream issuing therefrom and in turn the gain and the frequency sensitivity or frequency response characteristic of the turbulence amplifier is selectively varied.

Referring now to FIG. 9 of the accompanying drawings there is illustrated a turbulence amplifier system in which the performance characteristics of a turbulence amplifier are selectively varied by varying the pressure supplied thereto. A proportional fluidic amplifier 191 of the stream interaction type comprises a power nozzle 193, left and right control nozzles 195 and 197 respectively and left and right output passages 199 and 201 respectively. The power stream issued from power nozzle 193 is selectively proportioned between left and right output passages 199 and 201 in accordance with the pressure differential applied between right and left control nozzles 197 and 195 respectively.

Output passages 199 and 201 are extended to form respective supply tubes 203 and 205 respectively for turbulence amplifiers 207 and 209. In order to assure laminar flow egressing from supply tubes 203 and 205 it may be necessary to include flow straightening vanes in output passages 199 and 201.

Downstream and coaxial with supply tube 203 is fluid receiver tube 211 for providing the output signal of turbulence amplifier 207. Downstream of and coaxial with tube 205 is receiver tube 213 for providing the output signal of turbulence amplifier 209. The spacing between tubes 203 and 211 and tubes 205 and 213 is provided in accordance with the same considerations discussed above in relation to the spacing between two tubes 151 and 153 in FIG. 7. Respective control signal sources 215 and 217 are provided for amplifiers 207 and 209 respectively, each supplying a low level (D.C.) control fluid flow signal or alternating (A.C.) fluid flow signal through respective control passages 219 and 221, which signal impinges upon the respective power streams of the two amplifiers.

It is readily apparent that the supply pressures for turbulence amplifiers 207 and 209 depend upon the position of the power stream of proportional amplifier 191. More particularly, when the power stream issuing from power nozzle 193 is undeflected, it divides generally between output passages 199 and 201 and the resultant streams issued from supply tubes 203 and 205 are of substantially the same equal Reynolds numbers. As the control signal applied to left control nozzle 195 of amplifier 191 dominates that applied to right control nozzle 197, the power stream issuing from power nozzle 193 is deflected toward right output passage 201 thereby providing a greater pressure at supply tube 205 than at supply tube 203. The pressure variation at the supply tubes is accompanied by a proportional velocity variation and therefore by a proportional Reynolds number variation in the power stream issued from the supply tubes. Variation of the Reynolds number in this manner controls the frequency response sensitivity of both turbulence amplifiers 207 and 209 in the manner described above.

Means are provided for isolating the effects at turbulence amplifier 207 from the effects of turbulence amplifier 209 and vice versa, such means comprising by way of example a compliant buffer plate 215.

In addition to the frequency response variation induced in turbulence amplifiers 207 and 209 by means of control signal variation at control nozzles 195 and 197 of proportional amplifier 191, there is also an output signal variation induced by the same expedient. More particularly, assuming a symmetrical system wherein amplifiers 207 and 209 are identical and wherein amplifier 191 is symmetrical about the longitudinal axis extending through the power nozzle 193, the gain characteristics and output signal levels (in the absence of control signals) of the two turbulence amplifiers are identical when the proportional amplifier 191 delivers identical or equal flow to each of output passages 199 and 201. The change in the output pressure of amplifier 207 is of opposite sense to that of amplifier 209 in response to differential pressure change across control nozzles 195 and 197 of amplifier 191. Naturally, by changing the pressure at supply tubes 203 and 205 the pressures received at receiver tubes 211 and 213 are varied accordingly and hence the output pressure range and gain characteristic of the turbulence amplifiers 207 and 209 may be selectively varied.

It is apparent that one can operate in asymmetric fashion simply by using configurations wherein amplifiers 207 and 209 are not identical units but instead have differing gain characteristics as a function of control signal frequency when supplied with equal flows from proportional amplifier 191. Similarly, the proportional amplifier 191 can be operated asymmetrically. In still another possible mode of operation the proportional amplifier might be replaced by a digital amplifier having a multi-stable state wherein different pressures can be applied to the various supply tubes of the turbulence amplifiers 207 and 209.

Figure 10:
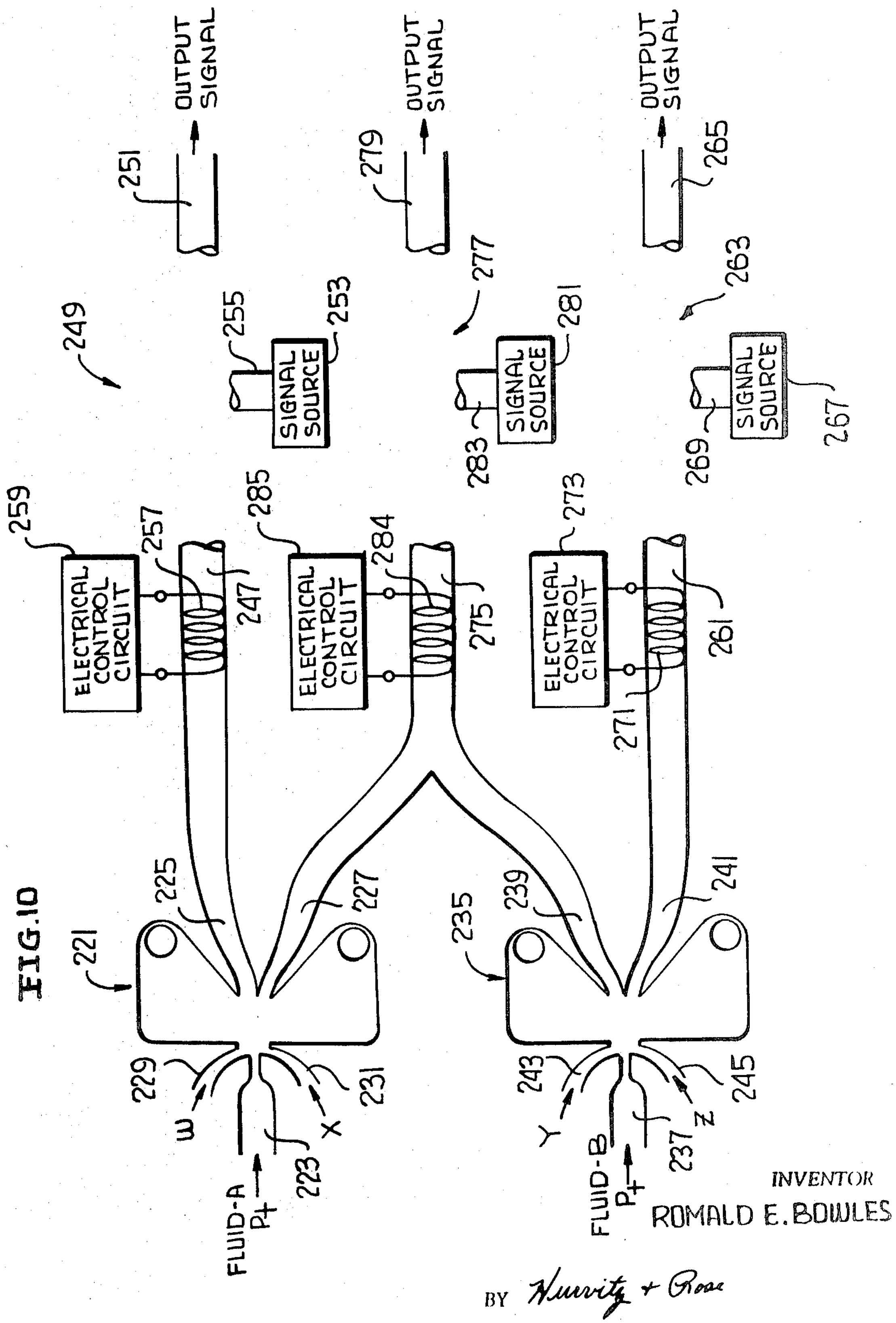
FIG. 10 is a schematic illustration of a turbulence amplifier system in which the temperature, qualitative composition and pressure of the power stream fluid may be selectively varied to vary the frequency response to the system.

Referring now to FIG. 10 of the accompanying drawings there is illustrated in schematic form a turbulence amplifier system wherein the Reynolds number of turbulence amplifier power streams may be varied by varying either the fluid temperature, fluid pressure, or qualitative composition of the fluid, or any of the three parameters in combination. More particularly, the circuit of FIG. 10 includes a first proportional fluidic amplifier 221 of the stream interaction type which receives a first pressurized fluid, denoted as fluid A in the drawing, at its power nozzle 223. A power stream of fluid A is directed from nozzle 223 toward a pair of output passages 225 and 227 between which the power stream is proportioned in response to variations in pressure applied to left and right control nozzles 229 and 231 respectively. For convenience the signal applied at left control nozzle 229 is designated W and the signal applied to right control nozzle 231 is designated X.

A second proportional fluidic amplifier 235 of the stream interaction type is provided with a source of pressurized fluid at its power nozzle 237. Power nozzle 237 issues a power stream of fluid B generally toward left and right output passages 239 and 241 respectively, the power stream dividing between passages 239 and 241 in accordance with the pressures applied to left and right control nozzles 243 and 245 respectively. The signal applied to left control nozzle 243 is designated Y and the signal applied to right control nozzle 245 is designated Z.

Left output passage 225 of amplifier 221 extends to form a supply tube 247 for a turbulence amplifier 249. Downstream of and coaxial with tube 247 is a fluid receiver tube 251 for providing the output signal from turbulence amplifier 249. A control signal source 253 supplies a low level fluidic signal through a control tube 255, which signal impinges upon the stream issuing from supply tube 247 and selectively induces turbulence therein. A heating element 257, selectively energizable by means of an electrical control circuit 259, is disposed within or about supply tube 247 to selectively heat the fluid flowing therein.

Right output passage 241 of proportional fluidic amplifier 235 is extended to form a supply tube 261 for a turbulence amplifier 263. Turbulence amplifier 263 is constructed substantially similar to turbulence amplifier 249 and is provided with a receiver tube 265, a control signal source 267, a control tube 269, a heating element 271 disposed in supply tube 261, and an electrical control circuit 273 for selectively energizing heating element 271.

Right output passage 227 of proportional amplifier 221 and left output passage 239 of proportional amplifier 235 are combined to form a single passage which receives flow from both of passages 227 and 239. This single passage comprises supply tube 275 for a turbulence amplifier 227. Turbulence amplifier 277 is constructed basically similar to turbulence amplifier 249 and 263 and comprises a receiver tube 279, a control signal source 281, a control tube 283, an electrical heating element 284 disposed within supply tube 275, and an electrical control circuit 285 for selectively energizing heating element 284.

It is readily seen that the relative strengths of input signals W and X to proportional fluidic amplifier 221 determines the proportioning of the power stream of fluid A between turbulence amplifiers 249 and 277. In this way the gain characteristic and frequency response characteristic of amplifiers 249 and 277 are varied by varying the supply pressures thereto much in the manner described for amplifiers 207 and 209 of FIG. 9. Similarly, the relative strengths of signals Y and Z applied to proportional fluidic amplifier 235 control the proportioning of power stream of fluid B between turbulence amplifiers 277 and 263 and thereby control the gain and frequency response characteristics of these amplifiers.

In addition, the relative strengths of signals W and X and the relative strengths of signals Y and Z determine the proportions of fluid A and fluid B present in the supply tube 275 of turbulence amplifier 277. If fluids A and B have substantially different physical properties, the viscosity and/or density and/or velocity of the fluid provided at supply tube 275 may be selectively varied in accordance with input signals W, X, Y and Z. Since viscosity and density and velocity are each factors in determining the Reynolds number of a fluid stream, the frequency characteristic of turbulence amplifier 227 may be varied in accordance with the proportions of fluids A and B applied to supply tube 275.

An additional means for providing Reynolds number variations in the fluid streams of turbulence amplifiers 249, 277 and 263 is present in the heating elements 257, 284 and 271 respectively, and their respective electric control circuits 259, 285 and 273. Reynolds number variation achieved by means of these heating elements has been described above and is accomplished in substantially the same manner described and illustrated in referenced FIG. 7.

Figure 11:
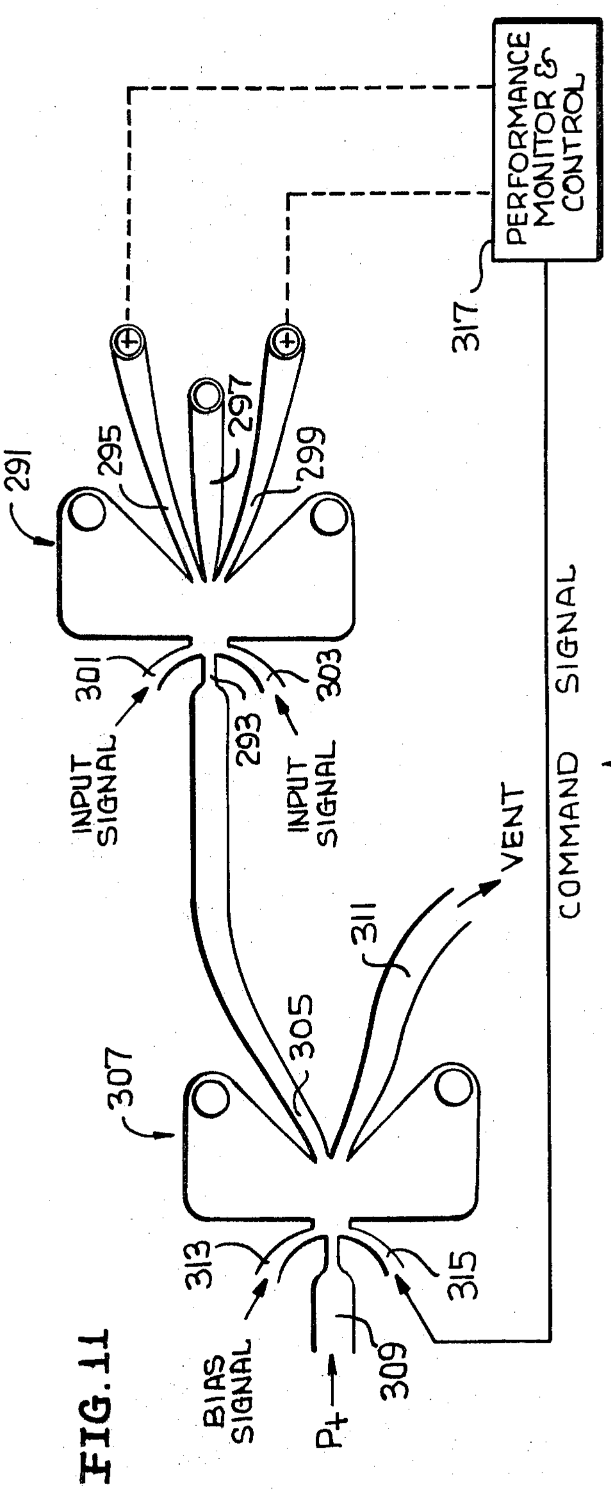
FIG. 11 is a schematic illustration of a fluidic amplifier system in which the power stream pressure of a fluidic amplifier is selectively varied in accordance with the amplifier performance so as to minimize power consumption and optimize amplifier signal-to-noise ratios.

Referring now to FIG. 11 of the accompanying drawings there is illustrated a proportional fluidic amplifier 291 of the stream interaction type in which the power stream pressure is selectively varied in accordance with monitored system performance in order to reduce power consumption and improve the signal-to-noise ratio of the amplifier. More specifically, amplifier 291 is a conventional stream interaction amplifier designed to operate in a proportional mode. It includes a power nozzle 293 responsive to application of pressurized fluid thereto for issuing a power stream of fluid directed generally toward left, center and right output passages 295, 297 and 299 respectively. Left and right control nozzles 301 and 303 respectively receive input signals in the form of fluid pressures for deflecting the power stream issued from power nozzle 293 relative to the output passage. Power nozzle 293 is connected to an output passage 305 of a further proportional fluidic amplifier 307. Fluidic amplifier 307 may be of the proportional stream interaction type and comprises a power nozzle 309 which responds to the application of pressurized fluid thereto for issuing a power stream generally toward a pair of output passages 305 and 311. Output passage 311 may be vented for purposes of the present utilization of amplifier 307. Left and right control nozzles 313 and 315 respectively control the deflection of the power stream issued from power nozzle 309 relative to the output passages 305 and 311. Left control nozzle 313 receives a constant pressure bias signal which, in the absence of a signal at control nozzle 315, determines the quiescent deflection of the power stream issued from power nozzle 309. Control nozzle 315 receives a command signal from a performance monitor control circuit 317, which circuit is basically responsive to a predetermined system parameter for controlling the deflection of the power stream issuing from power nozzle 309 in amplifier 307. Examples of circuits suitable for performing the functions required of control circuit 317 may be found in my co-pending U.S. patent application Ser. No. 4,315 referenced in column 1 hereof.

Figure 12:
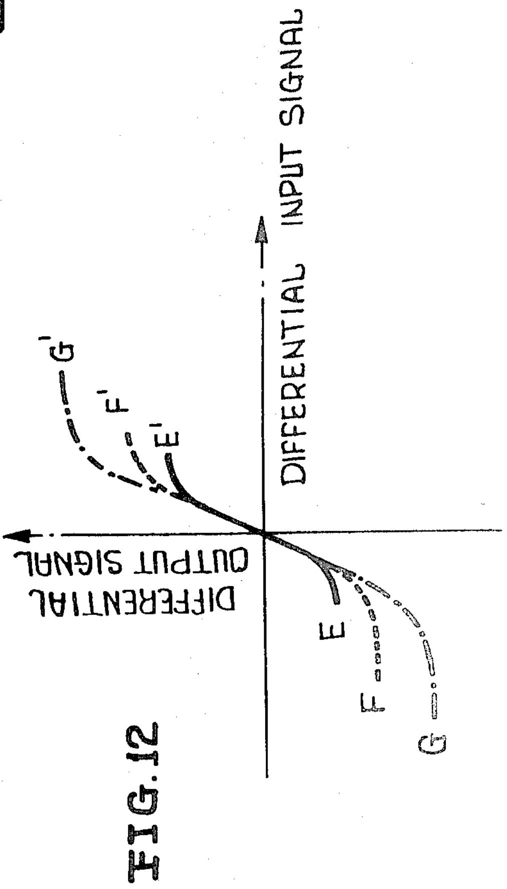
FIG. 12 is a plot of three possible output pressure versus input pressure characteristics for a conventional fluidic amplifier.

In considering the operation of the circuit illustrated in FIG. 11 the following background should be borne in mind. In conventional proportional fluidic amplifiers of the stream interaction type, the quiescent (i.e., in the absence of input signals to the control nozzles) noise level is strongly influenced by the magnitude of the pressure applied to the amplifier power nozzle. In general, the gain of the amplifier is quite independent of the supply pressure level mainly because the transverse pressure gradient of the power stream retains the same general configuration over a large variation of power stream pressures. In FIG. 12 there is illustrated a set of differential output pressure versus differential input pressure characteristics for a conventional stream interaction fluidic amplifier, wherein curves EE′, FF′ and GG′ represent the gain characteristic of the amplifier for three respective successively higher power stream pressures. It is noted that the slopes of the curves EE′, FF′ and GG′ are substantially the same indicating that the linear gain does not vary substantially with power stream variations. It is clear that if the input signals are such that the amplifier output fluctuates only within the linear portion of the curve EE′, a corresponding low level of supply pressure may be utilized. Utilizing the low level of supply pressure, noise level and power consumption are substantially reduced. Additionally the non-linear portion of performance can selectively be brought within or excluded from the control signal range or command. Consequently, a control of the supply pressure may be provided to respond to a command signal.

In FIG. 11 the command signal for controlling the supply pressure to amplifier 291 is provided at control nozzle 315 of amplifier 307. This command signal emanates from the performance monitor and control circuit 317 which for example, may monitor the peak amplitude of the output signal of amplifier 291 and establish a desired supply pressure for amplifier 291 so as to reduce the noise and yet maintain a margin of safety in the gain characteristic for amplifier 291 so that the amplifier continues to operate on the linear portion of its gain characteristic. By selectively proportioning the power stream issued from power nozzle 309 between output passage 305 and 311, the command signal accomplishes the required power stream pressure variation in amplifier 291.

Of course, instead of monitoring peak amplitude as the figure of merit for system performance, circuit 317 may, by way of example, be utilized to sense any of the following:

(a) A greater output signal amplitude from amplifier 291 than has been experienced during a predetermined time interval prior to the sensing time;

(b) A greater amplitude of the output signal from amplifier 291 than the present average value of the amplitude;

(c) A predetermined rate of change of the amplitude of the signal provided by amplifier 291 (as disclosed in my co-pending U.S. Patent application Ser. No. 4,315 referenced in column 1 hereof.

The supply pressure control element need not be a proportional fluidic amplifier such as amplifier 307. It may be a conventional valve, a digital fluidic amplifier, or a combination thereof.

The circuit of FIG. 11 is especially useful in systems which operate on standby power, retaining the ability to process signals but with relatively low demand as regards to output power or with lower required speed of response. Under certain circumstances these systems must suddenly operate at peak output power conditions, and the circuit of FIG. 11 is designed expressly to permit sudden changes in output power.

While I have described and illustrated one specific embodiment of my invention, it will be clear that variation of the details of construction which are specifically illustrated and described may be resorted to without departing from the spirit and scope of the invention as defined in the appended claims.

I claim:

1. A fluid-operated system in which the working fluid has a variable physical parameter, said system including a fluid passage for conducting said working fluid and a member disposed in said fluid passage, said member comprising material which varies in size to change the cross-sectional configuration of said fluid passage in accordance with variations in said physical parameter of the working fluid contracting said member in said fluid passage.

2. The fluid operated system according to claim 1 further comprising means for controllably varying said physical parameter of said working fluid.

3. The combination according to claim 2 wherein said physical parameter is the temperature of said working fluid.

4. The combination according to claim 2 wherein said working fluid is a gas and said physical parameter is the moisture content of said gas.

5. The combination according to claim 2 wherein said working fluid comprises one or more fluids of the same phase and wherein said physical parameter is the qualitative composition of said working fluid.

6. The combination according to claim 2 wherein said working fluid comprises a single fluid having different phases and wherein said physical parameter comprises the phasal composition of said working fluid.

7. The combination according to claim 2 wherein said working fluid comprises plural fluids of which at least one has different phases, and wherein said physical parameter comprises the phasal composition of said working fluid.

8. The combination according to claim 2 wherein said physical parameter is the viscosity of said working fluid.

9. The combination according to claim 2 wherein said physical parameter is the density of said working fluid.

10. The combination according to claim 2 wherein said physical parameter is the pressure of said working fluid.

11. A fluidic amplifier for utilization with a working fluid having a selectively variable physical parameter, said amplifier comprising:

a fluid output passage;

input means responsive to application of an input signal thereto for providing a working fluid output signal at said fluid output passage as a function of said input signal;

variable impedance means disposed in said fluid output passage and responsive to variations in said physical parameter of said working fluid in said fluid output passage for correspondingly varying said function.

12. The fluidic amplifier according to claim 11 wherein said variable physical parameter is the temperature of said working fluid.

13. The fluidic amplifier according to claim 11 wherein said variable physical parameter is the qualitative composition of said working fluid.

14. A variable gain proportional fluidic amplifier comprising:

an interaction region;

at least one output passage;

a power nozzle responsive to application of pressurized fluid thereto for issuing a power stream of fluid across said interaction region generally toward said output passage;

control means for selectively varying the portion of said power stream delivered to said output passage;

wherein said output passage is an elongated relatively narrow fluid flow passage divided into two confined fluid flow channels; and temperature-responsive means located in at least one of said channels for varying the impedance to fluid flow of said one channel in response to temperature variations in said one channel.

15. The fluidic amplifier according to claim 14 wherein said temperature responsive means comprises an insert secured to a wall of said one channel, said insert being fabricated of gutta-percha.

16. The fluidic amplifier according to claim 14 further comprising a second output passage disposed for selectively receiving said power stream and comprising an elongated relatively narrow fluid flow passage divided into two confined fluid flow channels, and temperature-responsive means located in at least one of said last-mentioned channels for varying the impedance to fluid flow therethrough in response to the history of temperature variations therein.

17. The fluidic amplifier according to claim 16 wherein said temperature-responsive means comprises a pair of inserts disposed substantially opposite one another and secured to respective opposite walls of said one channel, said inserts expanding in response to temperature increases in said channel.

18. The fluidic amplifier according to claim 17 wherein said at least one channel in both of said output passages communicates with a reference pressure at the downstream end thereof.

19. The fluidic amplifier according to claim 16 wherein said temperature responsive means comprises an insert secured to a wall of said one channel in both said output passages, and comprising material which expands in response to increasing temperature in said one channel.

20. The fluidic amplifier according to claim 19 wherein said at least one channel in both said output passages communicates with a reference pressure at their downstream end.

21. The fluidic amplifier according to claim 14 wherein said temperature responsive means comprises a pair of inserts disposed substantially opposite one another and secured to respective opposite walls of said one channel, said inserts being comprised of a material which expands in response to increasing temperature in said one channel.

22. The fluidic amplifier according to claim 21 wherein said at least one channel communicates with a reference pressure at its downstream end.

23. A fluidic amplifier operable with a working fluid having a selectively variable qualitative composition, and having a variable output signal versus input signal characteristic, said amplifier comprising:

an interaction region;

at least one output passage;

a power nozzle responsive to application of pressurized fluid thereto for issuing a power stream of fluid across said interaction region generally toward said output passage;

control means for selectively varying the amplitude of delivery of said power stream to said output passage;

wherein said output passage is an elongated relatively narrow fluid flow passage divided into two confined fluid flow channels; and variable impedance means located in at least one of said channels for varying the impedance to fluid flow through said one channel in response to variations in the qualitative composition of fluid flowing in said one channel.

24. The fluidic amplifier according to claim 23 wherein said one channel communicates with a reference pressure at its downstream end.

25. The fluidic amplifier according to claim 23 wherein said variable impedance comprises an insert secured to a wall of said one channel and comprising material which expands in the presence of a first specified fluid other than said pressurized fluid and which contracts in the presence of a second specified fluid other than said pressurized fluid.

26. The fluidic amplifier according to claim 23 wherein said variable impedance means comprises a pair of inserts disposed substantially opposite one another and secured to respective opposite walls of said one channel, said inserts being comprised of a material which expands in the presence of a specified fluid other than said pressurized fluid.

27. The fluidic amplifier according to claim 26 wherein said one channel communicates with a reference pressure at its downstream end.

28. The fluidic amplifier according to claim 26 further comprising means for selectively adding said specified fluid to said pressurized fluid.

29. The fluidic amplifier according to claim 26 wherein said material is a moisture-expandable plastic and said specified fluid is water.

30. The fluidic amplifier according to claim 23 wherein said variable impedance means comprises a pair of inserts disposed substantially opposite one another and secured to respective opposite walls of said one channel, said inserts being comprised of a material which contracts in the presence of a specified fluid other than said pressurized fluid.

31. The fluidic amplifier according to claim 30 wherein said one channel communicates with a reference pressure at its downstream end.

32. The fluidic amplifier according to claim 30 further comprising means for selectively adding said specified fluid to said pressurized fluid.

33. The fluidic amplifier according to claim 30 wherein said material is a moisture-expandable plastic and said specified fluid is ammonia fumes.

34. The fluidic amplifier according to claim 23 wherein said variable impedance means comprises an insert secured to a wall of said one channel and comprising material which varies in size in the presence of a specified fluid other than said pressurized fluid.

35. The fluid amplifier according to claim 34 further comprising means for selectively adding said specified fluid to said pressurized fluid.

36. The fluidic amplifier according to claim 34 wherein said material is a moisture-expandable plastic and said specified fluid is water.

37. The fluidic amplifier according to claim 34 wherein said one channel communicates with a reference pressure at its downstream end.

38. The fluidic amplifier according to claim 37 further comprising means for selectively adding said first and second specified fluids to said pressurized fluid.

39. The fluidic amplifier according to claim 37 wherein said material is a moisture-expandable plastic, said first specified fluid is water and said second specified fluid is ammonia fumes.

40. The fluidic amplifier according to claim 23 wherein said variable impedance means comprises an insert secured to a wall of said one channel and comprising material which contracts in the presence of a specified fluid other than said pressurized fluid.

41. The fluidic amplifier according to claim 40 wherein said one channel communicates with a reference pressure at its downstream end.

42. The fluidic amplifier according to claim 40 further comprising means for selectively adding said specified fluid to said pressurized fluid.

43. The fluidic amplifier according to claim 40 wherein said material is a moisture-expandable plastic and said specified fluid is ammonia fumes.

44. The fluidic amplifier according to claim 23 wherein said variable impedance means comprises a pair of inserts disposed substantially opposite one another and secured to respective opposite walls of said one channel, said inserts being comprised of a material which expands in the presence of a first specified fluid other than said pressurized fluid and which contracts in the presence of a second specified fluid other than said pressurized fluid.

45. The fluidic amplifier according to claim 44 further comprising means for selectively adding said first and second specified fluids to said pressurized fluid.

46. The fluidic amplifier according to claim 44 wherein said material is a moisture-expandable plastic, said first specified fluid is water, and said second specified fluid is ammonia fumes.

47. A fluidic amplifier having a selectively variable output signal amplitude versus frequency response characteristic, said fluidic amplifier comprising:
- output passage means;
- input means responsive to application of a fluid input signal thereto for providing a fluid output signal at said output passage means as a predetermined function of said fluid input signal;
- fluidic capacitor means connected to receive said fluid output signal from said output passage means; and
- control means responsive to temperature variations in the fluid received by said output passage means for providing variations in the capacity of said fluidic capacitor means.

48. The fluidic amplifier according to claim 47 wherein said output passage means comprises a pair of output passages for providing a pair of fluid output signals, wherein said fluidic capacitor means comprises a pair of fluidic capacitors, each connected to receive fluid from a different one of said output passages, and wherein said control means comprises a mass of material disposed in each of said fluidic capacitors, said material expanding in response to temperature increases in the fluid received by said output passages.

49. The fluidic amplifier according to claim 48 wherein said material is gutta-percha.

50. A fluidic amplifier, operable with a predetermined working fluid, and having a selectively variable output signal amplitude versus frequency characteristic, said fluidic amplifier comprising:
- output passage means;
- input means responsive to application of a fluid input signal thereto for providing a fluid output signal at said output passage means as a predetermined function of said fluid input signal;
- fluidic capacitor means connected to receive said fluid output signal from said output passage means; and
- control means responsive to variations in the qualitative composition of fluid in said fluidic capacitor means for providing the corresponding variations in the capacity of said fluidic capacitor means.

51. The fluidic amplifier according to claim 50 wherein said output passage means comprises a pair of output passages for providing said fluid output signal as a differential pressure, wherein said fluidic capacitor means comprises a pair of fluidic capacitors, each connected to receive fluid from a respective one of said output passages, and wherein said control means comprises a mass of material disposed in said fluidic capacitors, said material being characterized by expansion in the presence of a specified fluid other than said predetermined working fluid.

52. The fluidic amplifier according to claim 51 further comprising means for selectively adding said specified fluid to said fluidic capacitors.

53. The fluidic amplifier according to claim 51 wherein said material is a moisture-expandable plastic and said specified fluid is water.

54. A fluidic amplifier according to claim 50 wherein said output passage means comprises a pair of output passages for providing said fluid output signal as a differential pressure, wherein said fluidic capacitor means comprises a pair of fluidic capacitors, each connected to receive a fluid from a respective one of said output passages, and wherein said control means comprises a mass of material disposed in said capacitors, said material contracting in the presence of said specified fluid other than said predetermined working fluid.

55. The fluidic amplifier according to claim 54 further comprising means for selectively adding said specified fluid to said working fluid.

56. A fluidic amplifier operable with a predetermined working fluid and having a variable output signal amplitude versus frequency characteristic, said fluidic amplifier comprising:
- an interaction region;
- at least one output passage;
- a power nozzle responsive to application thereto of said working fluid under pressure for issuing a power stream of fluid across said interaction region generally toward said output passage;
- control means responsive to application of fluid input signals thereto for selectively varying the amplitude with which said power stream is delivered to said output passage;
- a fluidic capacitor connected downstream of said output passage to receive fluid therefrom;
- and control means responsive to the presence of a specified fluid other than said working fluid in said fluidic capacitor for modifying the capacity of said capacitor.

57. A fluidic amplifier operable with a predetermined working fluid and having a selectively variable output signal versus frequency characteristic in response to a variable frequency input signal, said fluidic amplifier comprising:
- output passage means;
- input means responsive to application of a fluid input signal thereto for providing a fluid output signal at said output passage means as a function of said input signal;
- fluidic capacitor means disposed to receive said fluid output signal from said output passage means;
- control means for selectively varying the capacity of said fluidic capacitor, said control means comprising means for introducing variable quantities of a specified fluid in said fluidic capacitor in order to vary the capacity thereof, said specified fluid being non-miscible with said working fluid.

58. The fluidic amplifier according to claim 57 wherein said working fluid is a gas and said specified fluid is a liquid.

59. The fluidic amplifier according to claim 58 wherein said working fluid is air and wherein said specified fluid is water.

60. A fluidic amplifier operable with a predetermined working fluid and having a varibale output signal amplitude versus frequency characteristic in response to a variable frequency input signal, said fluidic amplifier comprising:
- an interaction region;
- at least one output passage;
- a power nozzle responsive to application of said working fluid under pressure thereto for issuing a power stream of said working fluid across said interaction region generally toward said output passage;
- input means responsive to application of a fluid input signal thereto for varying the amplitude with which said power stream is delivered to said output passage;
- a fluidic capacitor connected in parallel circuit relationship with said output passage;
- first control means for introducing a control fluid at a selectively variable depth into said fluidic capacitor to correspondingly vary the capacity of said fluidic capacitor, said control fluid being substantially nonmiscible with said working fluid.

61. The fluidic amplifier according to claim 60 further comprising:
- a second output passage disposed to selectively receive said power stream in response to deflection thereof by said input means;
- a second fluidic capacitor connected in parallel circuit relationship with said second output passage;
- second control means for introducing a control fluid at a selectively variable depth into said second fluidic capacitor to correspondingly vary the capacity of said of said second fluidic capacitor, said control fluid being substantially non-miscible with said working fluid.

62. The fluidic amplifier according to claim 61 wherein said first and second control means are synchronized to maintain equal capacity for both said fluidic capacitors.

63. The fluidic amplifier according to claim 61 wherein said first and second control means are operable to provide control fluid to said fluidic capacitors independently of one another.

64. A fluidic turbulence amplifier operable with a specified working fluid and responsive to application of a fluid input signal thereto for providing a fluid output signal, said amplifier having a variable output signal amplitude versus input signal frequency characteristic, said amplifier comprising:

source means responsive to application thereto of said working fluid under a specified pressure for issuing a substantially laminar power stream, said power stream having a predetermined Reynolds number;

means responsive to said fluid input signal for selectively inducing turbulence in said power stream as a function of said input signal;

output means for selectively varying the Reynolds number of said power stream whereby to change the sensitivity of said stream to be rendered turbulent at specified frequencies of said input signal.

65. The turbulence amplifier according to claim 64 wherein said control means comprises means for selectively varying the temperature of the pressurized working fluid applied to said source means.

66. The turbulence amplifier according to claim 65 wherein said last-mentioned means comprises electrical heater circuit means, including an electrical heater element disposed in said source means for selectively heating the working fluid prior to its issuance as said power stream.

67. The turbulence amplifier according to claim 65 wherein said last-mentioned means comprises means for selectively passing heated fluid over said source means to heat the working fluid therein prior to issuance of said working fluid as said power stream.

68. The fluidic amplifier according to claim 67 wherein said means for selectively passing heated fluid comprises fluidic amplifier means having at least one output passage thereof disposed for directing said heated fluid toward said source means.

69. The turbulence amplifier according to claim 64 wherein said control means comprises means for selectively varying the qualitive composition of said working fluid applied to said source means.

70. The turbulenec amplifier according to claim 64 wherein said control means comprises means for applying two different fluids under pressure in selectively variable proportions to said source means.

71. The fluidic amplifier according to claim 70 wherein said last-mentioned means comprises:

a first fluidic amplifier having a power nozzle responsive to application of pressurized fluid thereto for issuing a power stream of fluid, means for applying one of said two different fluids under pressure to said power nozzle, an output passage for receiving said power stream, and means for selectively varying the amplitude with which said power stream is delivered to said output passage;

a second fluidic amplifier having a power nozzle responsive to application of pressurized fluid thereto for issuing a power stream of fluid, means for applying a second of said two different fluids under pressure to said power nozzle, an output passage for receiving said power stream, and means for selectively varying the amplitude with which said power stream is delivered to said output passage;

means for combining flows in said output passages of said first and second fluidic amplifiers to provide a common output passage; and means for connecting said output passage to said source means.

72. The turbulence amplifier according to claim 64 wherein said control means comprises means for selectively varying the pressure of which said working fluid is applied said source means.

73. The turbulence amplifier according to claim 72 wherein said means for selectively varying the pressure comprises a fluidic amplifier having at least two output passages, means for connecting one of said output passages to said source means for providing pressurized fluid thereto, and means for selectively distributing pressurized fluid between said output pssages of said fluidic amplifier to vary the pressure of fluid applied to said source means.

74. A fluidic amplifier operable with a specified working fluid having a selectively variable physical parameter, said amplifier including a fluid passage in which said working fluid flows, said fluid passage having a cross-section which varies in response to variations in said physical parameter of the working fluid in said fluid passage.

75. The fluidic amplifier according to claim 74 wherein said fluid passage is an input passage of said amplifier.

76. The fluidic amplifier according to claim 74 wherein said fluid passage is an output passage of said amplifier.

77. The fluidic amplifier according to claim 76 further comprising:

an interaction region;

a power nozzle responsive to application of pressurized working fluid thereto for issuing a power stream of working fluid into said interaction region;

wherein said output passage is disposed across said interaction region from said power nozzle in receiving relationship with said power stream;

a control nozzle responsive to pressurized fluid applied thereto for issuing a control stream into said interaction to deflect said power stream; and means for applying fluid to said control nozzle at a pressure which is a function of said input signal.

78. A fluidic amplifier operable with a specified working fluid having a variable physical parameter, said amplifier including a bifurcated outlet passage forming two distinct channels, at least one of said channels having disposed therein a member which varies in size in response to variations in said physical parameter of the working fluid contacting said member.

References Cited

UNITED STATES PATENTS

| | | | |
|---|---|---|---|
| 3,148,691 | 9/1964 | Greenblott | 137—81.5 |
| 3,171,421 | 3/1965 | Joesting | 137—81.5 |
| 3,182,674 | 5/1965 | Horton | 137—81.5 |
| 3,228,411 | 1/1966 | Straub | 137—81.5 |
| 3,321,955 | 5/1967 | Hatch, Jr. | 137—81.5 X |
| 3,348,562 | 10/1967 | Ogren | 137—81.5 |
| 3,361,149 | 1/1968 | Meyer | 137—81.5 |
| 3,362,421 | 1/1968 | Schaffer | 137—81.5 |
| 3,413,994 | 12/1968 | Sowers III | 137—81.5 |
| 3,452,767 | 7/1969 | Posmgies | 137—81.5 |
| 3,461,777 | 8/1969 | Spencer | 137—81.5 X |

SAMUEL SCOTT, Primary Examiner